United States Patent [19]

Holen

[11] Patent Number: 5,577,563

[45] Date of Patent: Nov. 26, 1996

[54] STACK-FOLDING TOOLBAR WITH FLOATING WINGS

[76] Inventor: Kurt Holen, Rte. 1, Box 14, Smithfield, Nebr. 68976

[21] Appl. No.: 507,889

[22] Filed: Jul. 27, 1995

[51] Int. Cl.⁶ ........................................... A01B 73/00
[52] U.S. Cl. ........................... 172/456; 172/457; 172/458; 172/460; 111/57
[58] Field of Search ...................... 172/456, 457, 172/458, 459, 460, 311, 662; 111/57; 56/228, 385

[56] References Cited

U.S. PATENT DOCUMENTS

| | | | |
|---|---|---|---|
| 3,680,172 | 8/1972 | Couser | 172/456 X |
| 3,692,121 | 9/1972 | Kenney | 172/456 |
| 4,126,189 | 11/1978 | Channel | 172/456 |
| 4,206,815 | 6/1980 | Hatcher | 172/311 |
| 4,449,590 | 5/1984 | Williamson | 172/456 X |
| 4,570,722 | 2/1986 | Osborn | 172/456 X |
| 4,583,598 | 4/1986 | Knels | 172/456 X |
| 4,612,997 | 9/1986 | Wilkins | 172/456 X |
| 4,660,654 | 4/1987 | Wiebe et al. | 172/456 X |
| 4,854,390 | 8/1989 | Stevens | 172/456 X |
| 4,986,367 | 1/1991 | Kinzenbaw | 172/456 X |
| 5,088,563 | 2/1992 | Shidler | 172/456 |

OTHER PUBLICATIONS

Maxemerge 2 Planters, brochure by Deere & Co.

*Primary Examiner*—Dave W. Arola
*Assistant Examiner*—Christopher J. Novosad
*Attorney, Agent, or Firm*—Henderson & Sturm

[57] ABSTRACT

A floating wing apparatus for toolbars which allows each wing to ride smoothly over terraced or rolling terrain, thereby providing a continuous, even contact between the implements carried thereon and the ground. Upper and lower pivot arms extend from the central section of the toolbar to the inner end of each wing section to form a parallelogram linkage which maintains the wing sections in a substantially horizontal orientation at all times, whether in the raised or lowered position. The upper pivot arm is pivotally connected to a pivot post, which is in turn pivotally connected to the central section. When working the land, this pivot post allows the wing sections and their attached implements to float or ride over uneven, rolling terrain. When the implements must be raised above the ground as during turning at the end of a field or when the wings are raised to the retracted position, the pivot posts are locked to a vertical position by means of hydraulic cylinders.

6 Claims, 7 Drawing Sheets

STACK-FOLDING TOOLBAR WITH FLOATING WINGS

TECHNICAL FIELD

The present invention relates to agricultural equipment, and more particularly to toolbars for drawing agricultural implements behind a tractor.

BACKGROUND ART

Tool bars were originally developed to provide a means for drawing several agricultural implements behind a tractor in unison in order to plant or cultivate several furrows at the same time. Such a toolbar, generally fabricated from an elongate steel beam of square, rectangular, or diamond cross-section, extends transversely behind the tractor where it is secured to the three-point tractor hitch. The implements are generally bolted to the toolbar and may be exchanged for other equipment when necessary.

As larger and more powerful tractors became available, the toolbars grew in length to accommodate as many as 24 furrows or rows of crop. As the length of the toolbars increased, transportation between fields and along roads and highways became a problem and it became necessary to develop a method of folding the toolbar to a more manageable width behind the tractor. Outer folding wings, pivotally attached to each end of a central section, were developed which could be folded upwardly to a vertical position over the central section to provide a narrower configuration during transportation. The greatest difficulty with this system is that, when the wing sections are folded, the implements attached thereto are rotated into a horizontal position. Not only does this place excessive side loading on the equipment, but when seeders or chemical applicators are being used, the contents of the hoppers or storage tanks will spill unless they are first emptied.

To overcome this problem, stack-folding toolbars were developed which utilize a pair of parallel arms extending between the central section and each wing section to form a parallelogram linkage. This linkage allows the wing sections to maintain a substantially horizontal orientation as they are hydraulically lifted upward and inward over the central section, thus overcoming the problems associated with the equipment rotating onto its side. While a significant improvement, these stack-folding toolbars are less than satisfactory in that when the wing sections are in the lowered, working position extending outward from the central section, the parallel arms allow for no vertical flexing of the wing sections. On terraced or hilly, rolling ground, this lack of vertical movement of the wing sections can cause the implements attached thereto to be forced out of their proper relationship with the soil. If the terrain drops off under one such wing section, planter gauge wheels can be lifted above the ground and seed delivery systems can be interrupted. If the terrain rises beneath such a wing section, inward binding can occur on the implements and on the wing section itself.

DISCLOSURE OF THE INVENTION

The present invention discloses a floating wing apparatus for toolbars which allows each wing to ride smoothly over terraced or rolling terrain, thereby providing a continuous, even contact between the implements carried thereon and the ground. Upper and lower pivot arms extend from the central section of the toolbar to the inner end of each wing section to form a parallelogram linkage which maintains the wing sections in a substantially horizontal orientation at all times, whether in the raised or lowered positions. The upper pivot arm is pivotally connected to a pivot post, which is in turn pivotally connected to the central section. When working the land, this pivot post allows the wing sections and their attached implements to float or ride over uneven, rolling terrain. When the implements must be raised above the ground as during turning at the end of a field or when the wings are raised to the retracted position, the pivot posts are locked to a vertical position by means of hydraulic cylinders.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
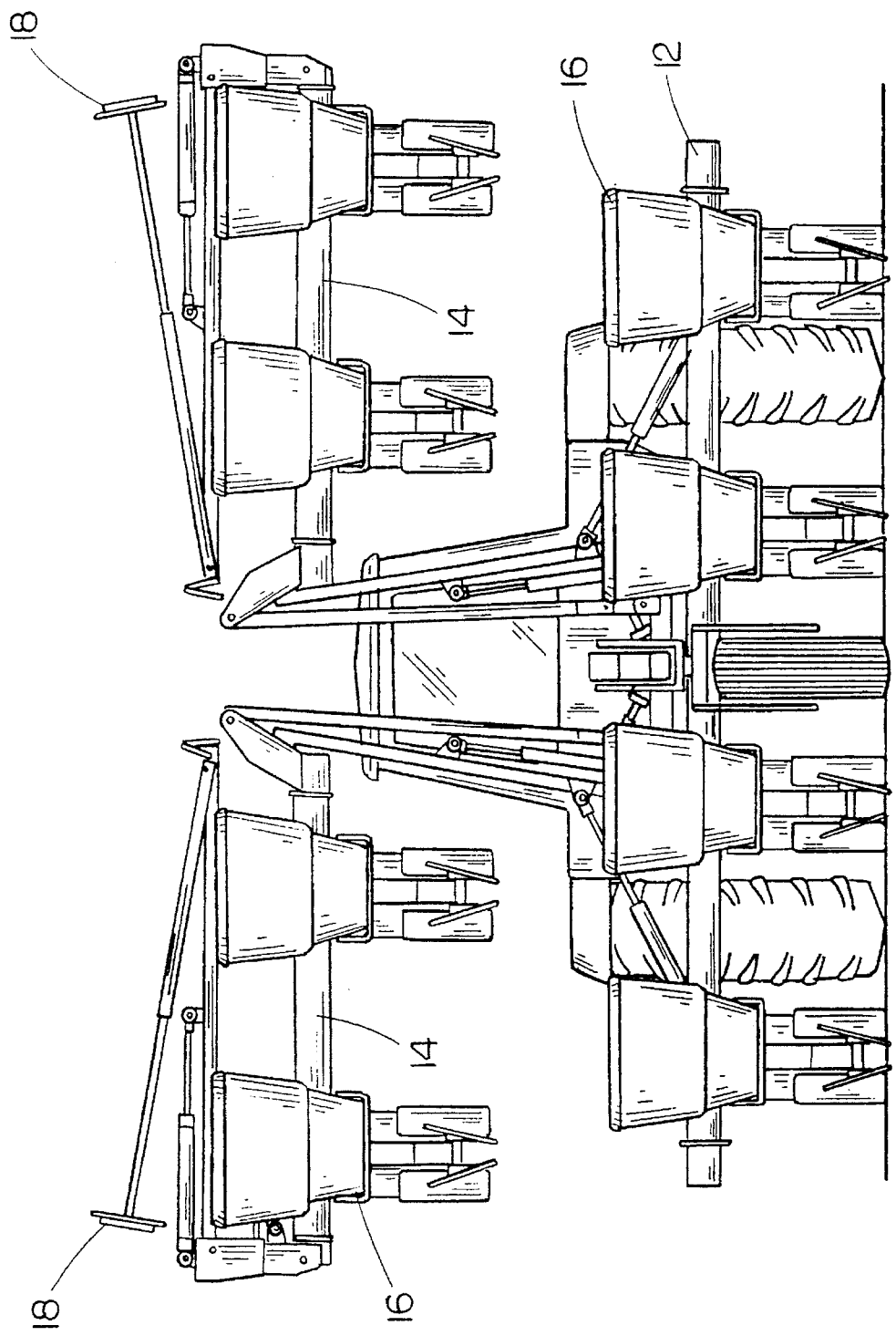
FIG. 1 is a rear elevational view of the invention in the raised, retracted position with eight seed planting units attached thereto and secured behind a tractor.
Figure 2:
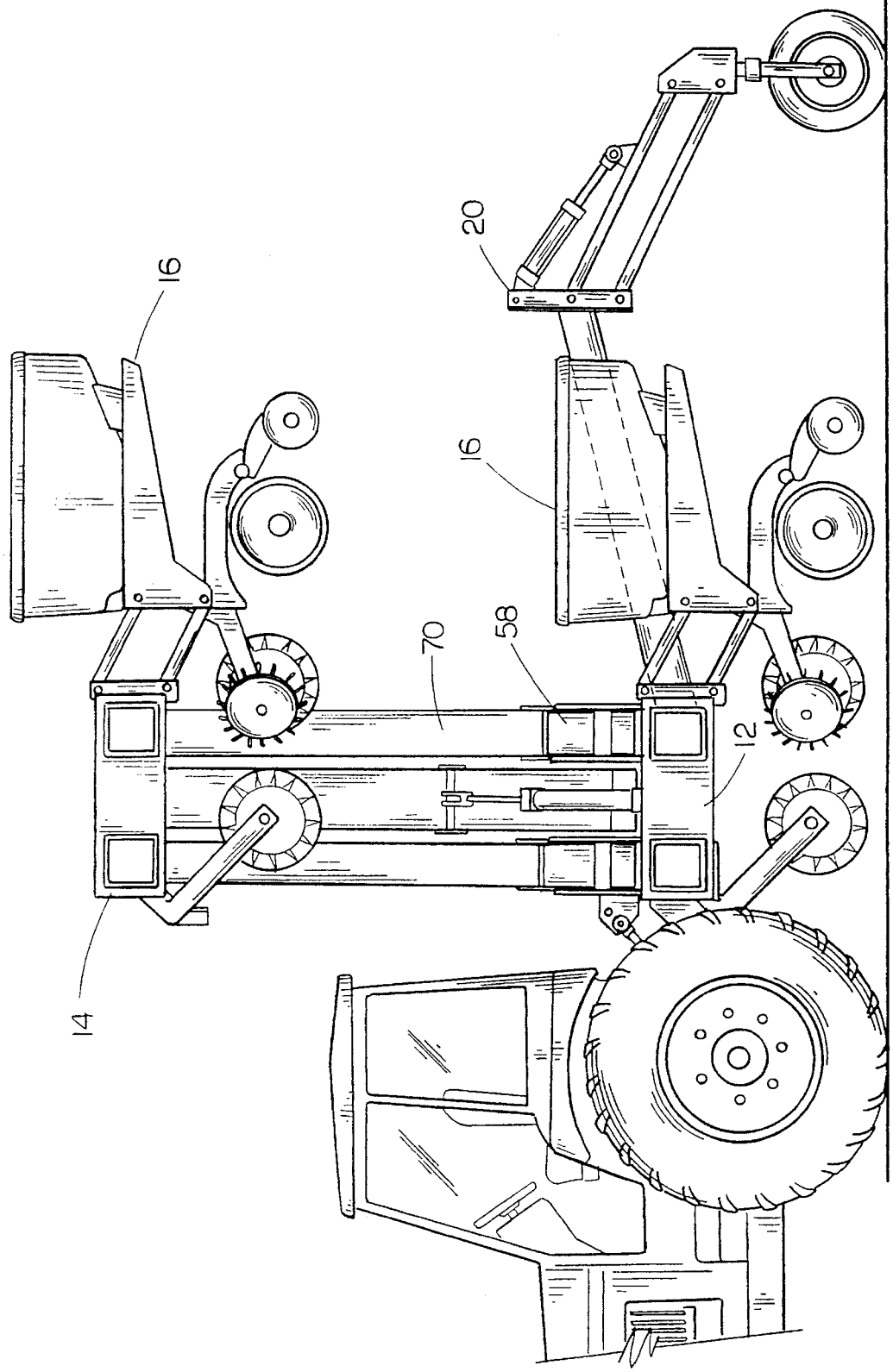
FIG. 2 is a side elevational view of the invention as depicted in FIG. 1, but with the row markers removed.

Referring now to the drawings, the toolbar 10 of the present invention can be seen to be comprised of a central section 12 and left and right wing sections 14. Inasmuch as the left and right wing sections are virtually identical, like reference numerals will be used in the following description for both left and right components for the sake of simplicity. As depicted in FIGS. 1 and 2, the invention, with eight planting units 16 and row markers 18 attached, is configured for transportation between fields wherein the implements are first elevated above the ground by means of the tractor's three point hitch and the lift assist 20 (depicted as a single unit for clarity although two are common). The left and right wing sections 14 are then raised to the retracted position by means of hydraulic cylinders 22 and 24.

Figure 6:
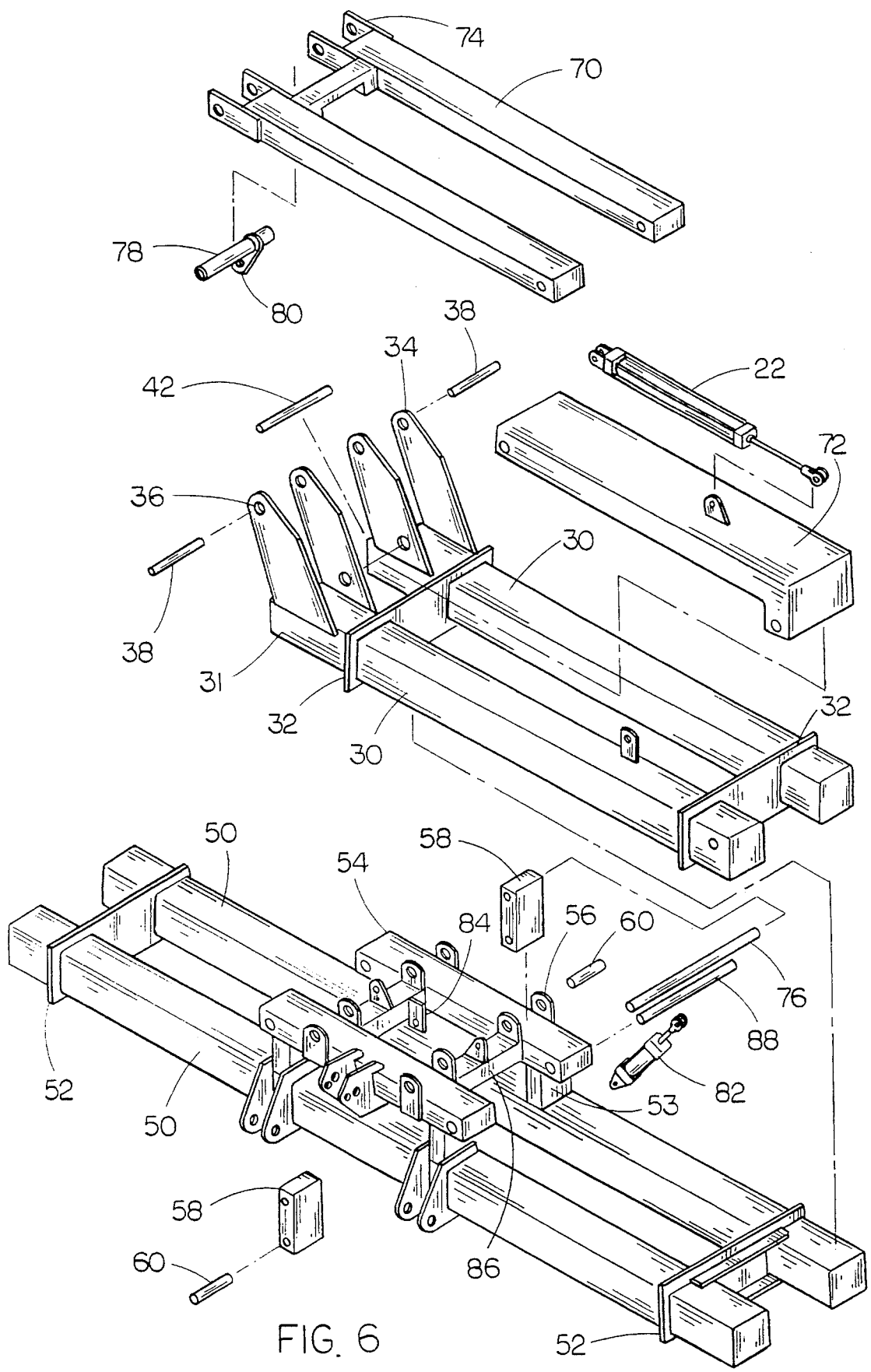
FIG. 6 is an exploded, perspective view depicting the central section and left wing section components of the invention.

With particular reference to FIG. 6, depicting the central section 12 and the components of the left wing section 14, the central section 12 is seen to be comprised of two tubular steel beams 50, preferably of seven inch square cross section, held in a parallel, spaced apart relationship by means of two steel plates 52 welded therebetween Four steel columns 53 are welded to the upper surface of the beams 50 and support a pair of crown bars 54. Each crown bar 54 has a pair of pivot brackets 56 welded thereto for receipt of a pivot post 58 which rides on a pivot pin 60.

The left wing section 14 is comprised of two tubular steel beams 30, preferably of seven inch square cross section, which are held in a parallel, spaced apart configuration by means of two steel plates 32. The inner end of each beam 30 has a U-shaped channel beam 31 welded thereto, with the channel facing downward and of sufficient inside diameter to rest over the outer end of its respective central section beam 50. Each of the channel beams 31 has a pair of pivot ears 34 welded to its upper edges, each of which has an upper hole 36 for receiving one of two upper pivot pins 38, while the inner ears 34 have an additional hole 40 for receiving a lower pivot pin 42.

Connecting the central section 12 and the wing section 14 is a pair of upper pivot arms 70 and a lower pivot arm 72, which in conjunction with the previously described ears 34, crown bar 54, and pivot posts 58, form a parallelogram linkage as will be further described. The inner end of each upper pivot arm 70 has a set of pivot brackets 74 welded thereto for pivotal attachment to the upper end of its respective pivot post 58 by means of pivot pin 76. It must be noted that a single pivot pin 76 extends through both sets of brackets 74 and both pivot posts 58, thus allowing it to carry a centrally located pivot tube 78. The pivot tube 78, which rotates freely on the pivot pin 76 between the two sets of pivot brackets 74, has a tab 80 welded thereto for receipt of the piston of a wing lock hydraulic cylinder 82. The opposing end of the wing lock hydraulic cylinder 82 is secured to a tab 84 welded to a crosspiece 86 extending between the upper crown bars 54.

The outer end of each upper pivot arm 70 has a pivot hole passing therethrough and extends between a pair of pivot ears 34 where it rides on its respective pivot pin 38. The lower pivot arm 72 has pivot holes passing through both its inner and outer ends, allowing it to pivot freely at its inner end on a pin 88 extending through apertures in the ends of the crown bars 54, and allowing it to pivot freely at its outer end on a pin 42 extending between the two inner pivot ears 34.

Figure 3:
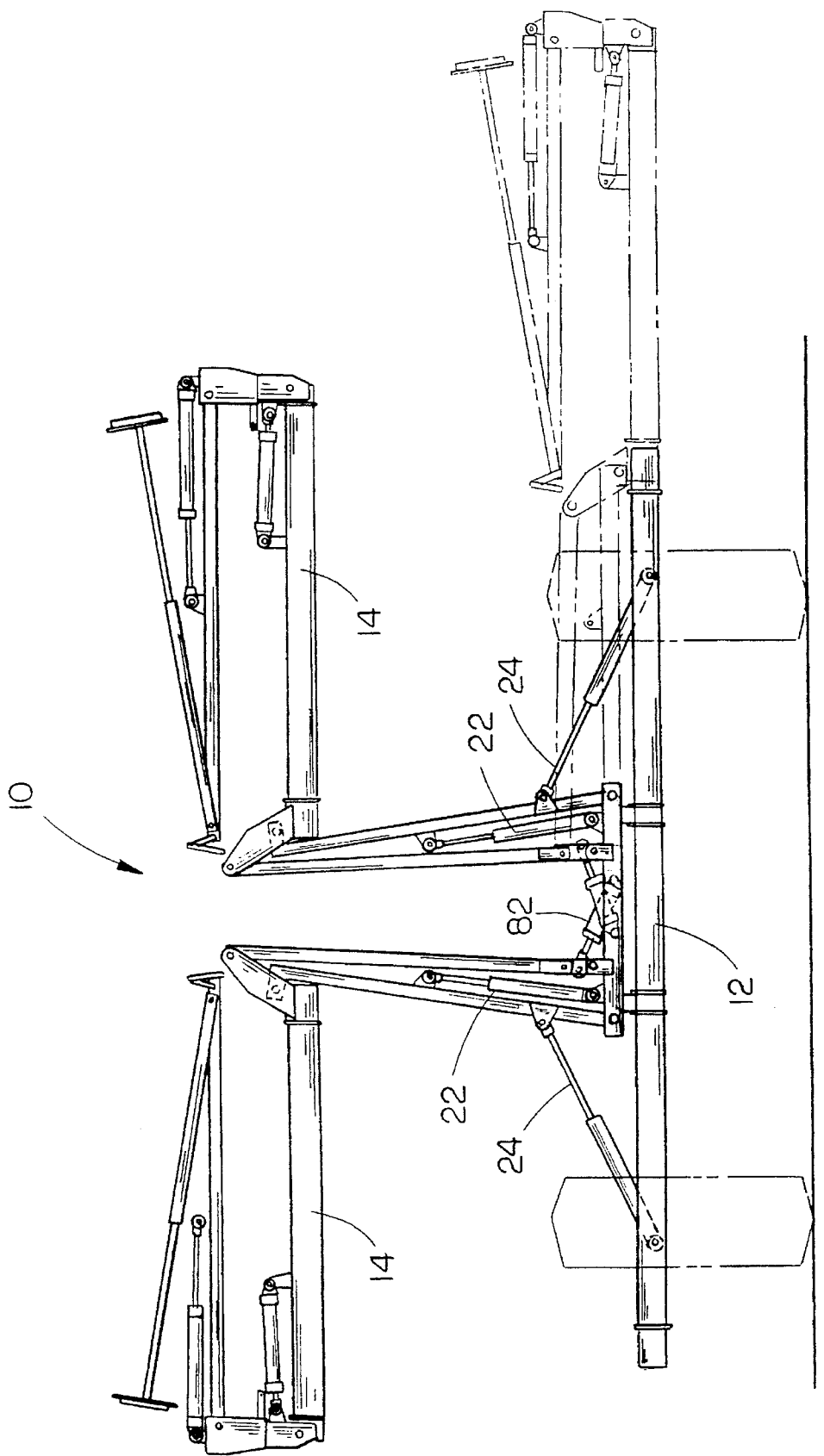
FIG. 3 is a rear elevational view of the invention with the implements and lift assist unit removed, and depicts the wings in the raised position in solid lines, and depicts the right wing in the lowered position in broken lines, with the tractor tires also shown in broken lines for purposes of orientation.
Figure 4:
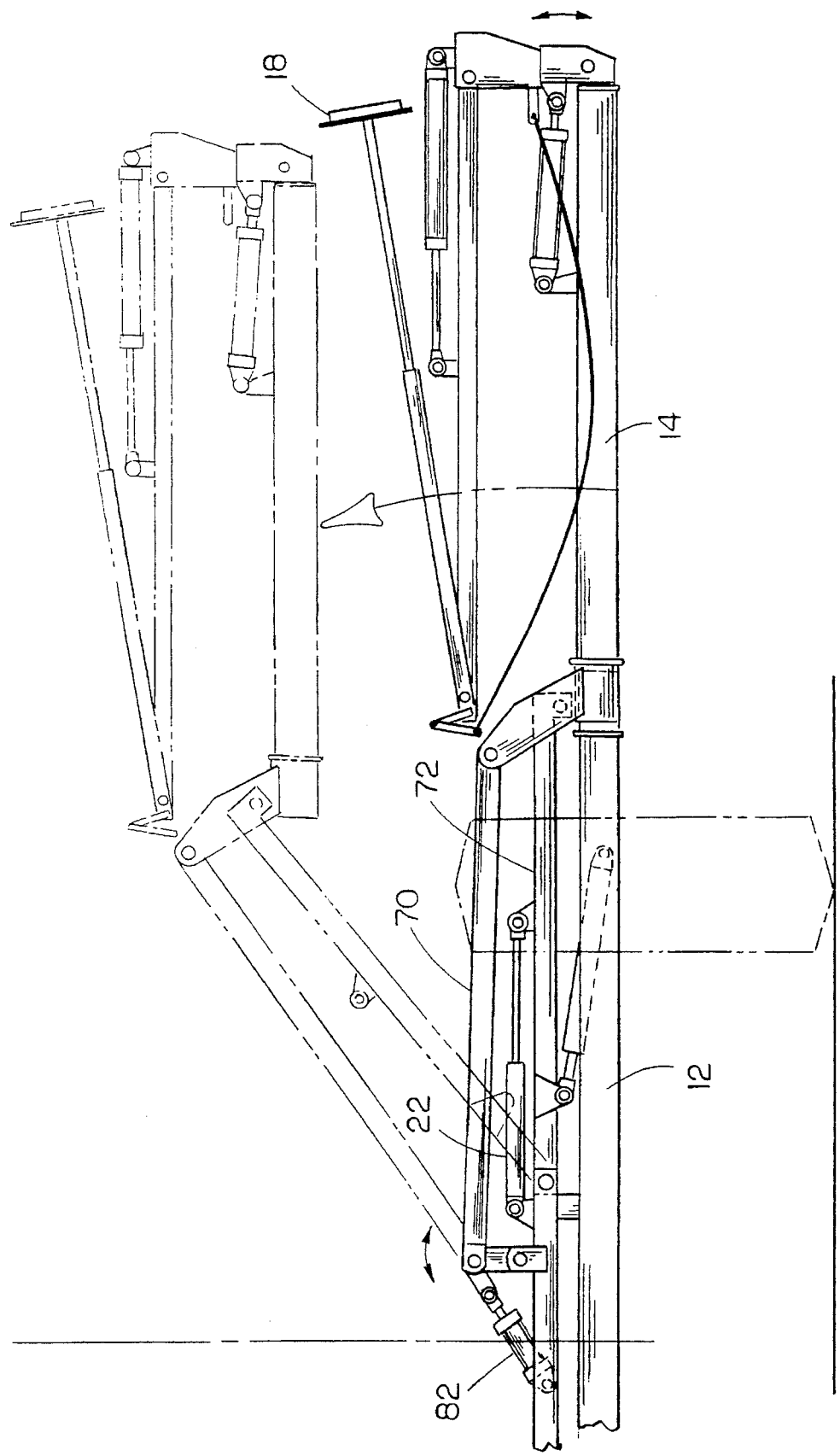
FIG. 4 is a rear elevational view of the right half of the invention with the right wing shown in the lowered position in solid lines and partially raised in broken lines.
Figure 5:
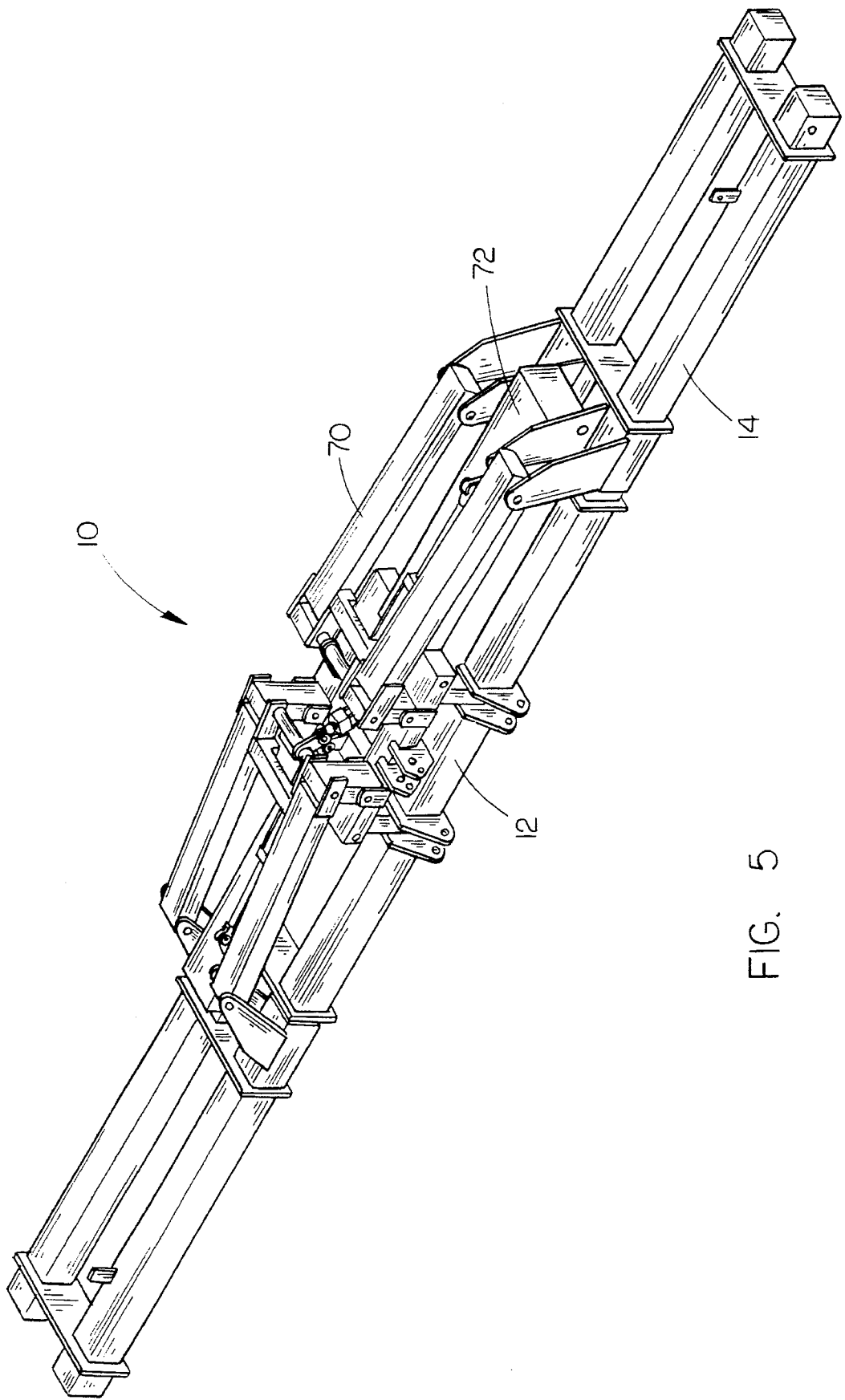
FIG. 5 is a perspective view of the invention with both wing sections in the lowered, extended position.

The wing section 14 is raised and lowered by means of an upper hydraulic cylinder 22, and a lower hydraulic cylinder 24, best seen in FIGS. 1, 3 and 4. In the preferred embodiment of the invention, two hydraulic systems are utilized: one simultaneously actuates the tractor's three point hitch, the rear lift assist units 20, and the wing lock hydraulic cylinders 82; while the second simultaneously actuates the wing section retract and extend cylinders 22, 24.

Figure 7:
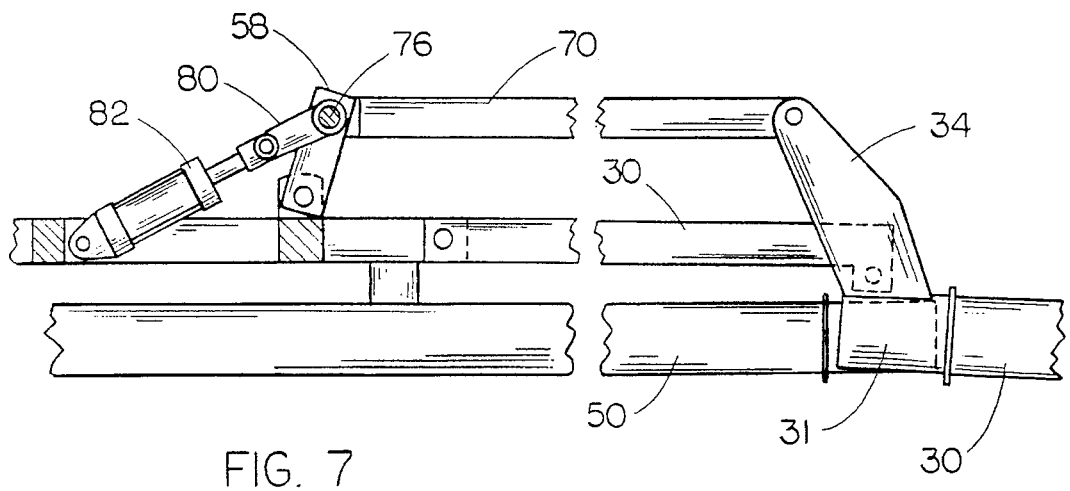
FIG. 7 is a partial elevational view, in partial section, depicting a wing section of the invention as it would droop to follow lower terrain as the pivot post rotates outward.
Figure 8:
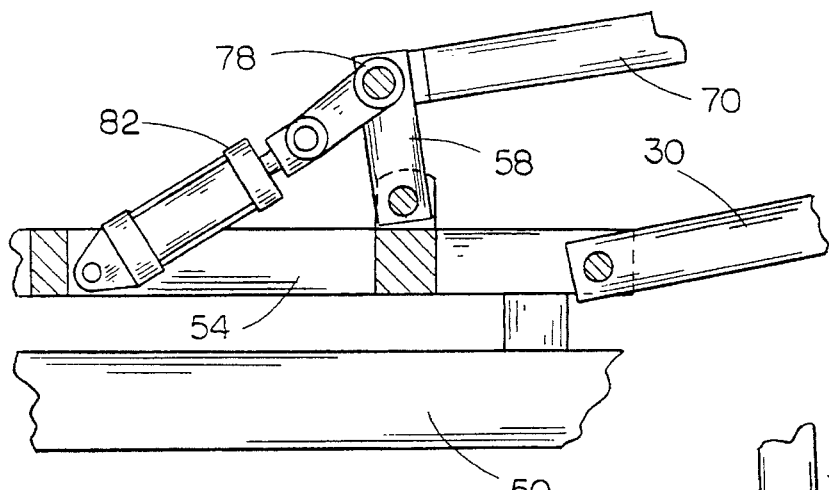
FIG. 8 is similar to FIG. 7, but with the wing section forced upward by elevated terrain and with the pivot post rotating inward.
Figure 9:
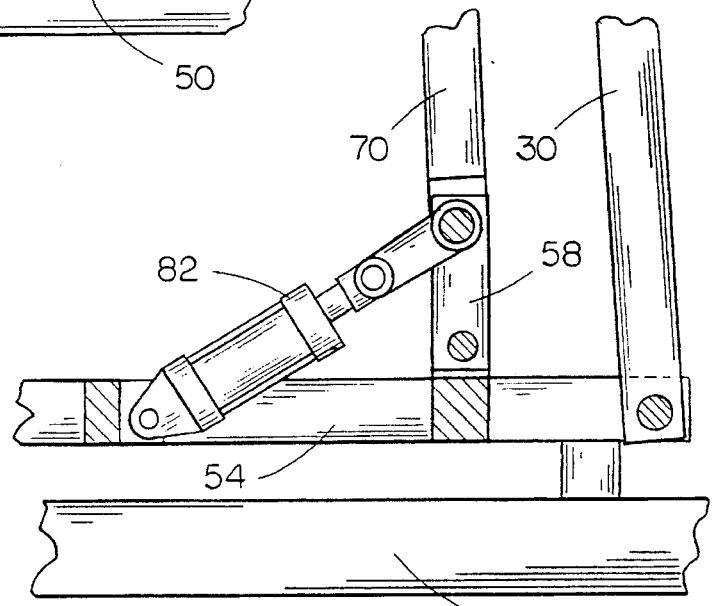
FIG. 9 is similar to FIG. 7 and FIG. 8, with the wing section in the raised, retracted position and with the pivot post locked in the vertical position by means of a hydraulic cylinder.

The operation of the components which allow the wing sections to float and to be locked into position are best described with reference to FIGS. 7–9. In FIGS. 7 and 8, the wing lock hydraulic cylinder 82 is unpressurized, thereby allowing the pivot post 58 to pivot inward and outward in response to undulating terrain beneath its wing section. In FIG. 7, the terrain has dropped off, with the wing section drooping in order to follow it. Since the hydraulic cylinder 82 is unpressurized, the piston is freely withdrawn from the cylinder, allowing the pivot post 82 to rotate outward as the pivot tube 78 rotates on the pivot pin 76. In FIG. 8, the terrain is elevated with the wing section rising to follow it. The piston of the hydraulic cylinder 82 is first driven to its innermost position, and then, as the cylinder is driven downward by the inwardly rotating pivot post 58, the piston is withdrawn slightly. In FIG. 9, the hydraulic cylinder 82 is pressurized, drawn to its innermost position, locking the pivot post 58 into a vertical position and thereby preventing further floating action of the wing section. It is at this time, when the wing lock hydraulic cylinders 82 are pressurized and the pivot posts 58 are locked, that the three point hitch and lift assist units 20 are also actuated, raising the equipment above the ground. If the wing sections are to be retracted into the transportation configuration, the wing retract hydraulic cylinders 22, 24 are also actuated.

Those skilled in the art will recognize that many modifications and variations of the present invention are possible in light of the above teachings. For, while the preferred embodiment described above discloses a double toolbar arrangement, it is intended that the following claims will encompass a single toolbar configuration as well. It is therefore to be understood that, within the scope of the appended claims, the invention may be practiced otherwise than as specifically described.

What is claimed is:

1. A stack-folding toolbar for drawing agricultural implements behind a tractor, comprising:
   (a) a central section, a left wing section and a right wing section;
   (b) a crown bar mounted above the central section;
   (c) left and right pivot posts pivotally connected to the crown bar at a point near its center;
   (d) left and right upper pivot arms, with the inner end of each upper pivot arm pivotally connected to its respective pivot post and the outer end of each upper pivot arm pivotally connected to the inner end of its respective wing section;
   (e) left and right lower pivot arms, with the inner end of each lower pivot arm pivotally connected to the ends of the crown bar, and the outer end of each lower pivot arm pivotally connected to the inner end of its respective wing section.

2. The toolbar as recited in claim 1, and further comprising means for preventing the pivot posts from pivoting whereby the wing sections are locked in a substantially horizontal position.

3. A stack-folding toolbar for drawing agricultural implements behind a tractor, comprising:
   (a) a central section, a left wing section, and a right wing section;
   (b) left and right linkage means, extending between said central section and said left and right wing sections, for moving said left and right wing sections between a raised, retracted position and a lowered, extended position while said wing sections are maintained in a substantially horizontal orientation; and
   (c) means for selectively locking in a vertical orientation and unlocking away from said vertical orientation said linkage means such that when said wing sections are in the lowered, extended position they may be selectively held in a horizontal configuration or allowed to float.

4. The toolbar as recited in claim 3 wherein said means for selectively locking and unlocking said linkage means comprises a pivot block interposed between said central section and said linkage means which may selectively be rigidly fixed or allowed to pivot.

5. The toolbar as recited in claim 4 wherein said linkage means is a parallelogram linkage having an upper pivot arm and a lower pivot arm, and said pivot block is interposed between said upper pivot arm and said central section.

6. The toolbar as recited in claim 3 and further comprising a crown bar mounted above said central section, said crown bar carrying said left and right linkage means and said means for selectively locking and unlocking said linkage means.

* * * * *